United States Patent
Ringström et al.

(10) Patent No.: US 9,020,520 B2
(45) Date of Patent: Apr. 28, 2015

(54) REDUCING INTERFERENCE IN A RADIO ACCESS NETWORK

(75) Inventors: Markus Ringström, Stockholm (SE); Torbjörn Wigren, Uppsala (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 128 days.

(21) Appl. No.: 13/823,347

(22) PCT Filed: Sep. 20, 2010

(86) PCT No.: PCT/SE2010/051001
§ 371 (c)(1), (2), (4) Date: Mar. 14, 2013

(87) PCT Pub. No.: WO2012/039653
PCT Pub. Date: Mar. 29, 2012

(65) Prior Publication Data
US 2013/0183994 A1    Jul. 18, 2013

(51) Int. Cl.
H04W 72/00    (2009.01)
H04W 72/12    (2009.01)
H04W 72/08    (2009.01)

(52) U.S. Cl.
CPC ........ H04W 72/1231 (2013.01); H04W 72/082 (2013.01)

(58) Field of Classification Search
None
See application file for complete search history.

(56) References Cited

U.S. PATENT DOCUMENTS

| | | |
|---|---|---|
| 2003/0218974 A1 | 11/2003 | Zuniga |
| 2005/0192042 A1 | 9/2005 | Au et al. |
| 2006/0068717 A1* | 3/2006 | Gandhi et al. ............. 455/67.13 |
| 2011/0128926 A1* | 6/2011 | Nama et al. .................. 370/329 |

FOREIGN PATENT DOCUMENTS

| | | |
|---|---|---|
| WO | 2010144004 A1 | 12/2010 |
| WO | 2010151189 A1 | 12/2010 |

OTHER PUBLICATIONS

Wigren, T. et al. "Estimation of uplink WCDMA load in a single RBS." 2007 IEEE 66th Vehicular Technology Conference, Sep. 30-Oct. 3, 2007, pp. 1499-1503, Baltimore, MD, USA.

Bai, W et al. "A Novel Resource Allocation Method for HSUPA with Successive Interference Cancellation." VTC-2008-Fall, IEEE 68th Vehicular Technology Conference, Sep. 21-24, 2008, pp. 1-5, Calgary, Canada.

Wigren, T. "Soft Uplink Load Estimation in WCDMA." IEEE Transactions on Vehicular Technology, Feb. 2009, pp. 760-772, vol. 58, No. 2.

* cited by examiner

Primary Examiner — Erika A Washington
(74) Attorney, Agent, or Firm — Murphy, Bilak & Homiller, PLLC (57) ABSTRACT

A method and apparatus for reducing an effect of user interference on other users in an uplink of a radio access network using interference suppression. A user, for example, the user experiencing the highest interference, is selected from a plurality of users using the radio access cell. A perceived Rise over Thermal value for the user after interference suppression is predicted in the event that scheduling grants to an interfering user in the radio access network are altered. On the basis of the prediction, scheduling grants to the interfering user are altered, thereby reducing the interference for the selected user.

18 Claims, 4 Drawing Sheets

REDUCING INTERFERENCE IN A RADIO ACCESS NETWORK

TECHNICAL FIELD

The present invention relates to the field of reducing interference in a radio access network.

BACKGROUND

High speed data transmission is becoming increasingly important in the mobile communications industry. Mobile Internet access and IPTV are just two applications that are driving this requirement. Wideband Code Division Multiple Access (WCDMA) uses high-speed downlink (DL) packet access and an enhanced uplink (EUL) to achieve high speed data transfer. Future mobile communication networks may use Interference Cancellation (IC) and Interference Suppression (IS) in order to achieve better performance in terms of, for example, peak data rates, system throughput and system capacity. IC and IS are applicable both on the DL and the uplink (UL).

IS relies on combining received signals such that any interference is suppressed and the Signal to Interference plus Noise Ratio (SINR) is maximized. There are many ways to achieve IS. Examples of IS include interference rejection combining, in which signals from more than one antenna are combined in order to suppress interference, and G-Rake+, in which interference is suppressed by "whitening" of the interference both in the temporal and the spatial domain.

Without IC, the load at the antenna connector can be expressed as the noise rise, or rise over thermal, RoT(t), defined by $$RoT(t) = \frac{RTWP(t)}{N(t)} \quad (1)$$

where N(t) is the thermal noise level measured at the antenna connector, and RTWP(t) is defined in Equation 2. This relative measure is not affected by the application of any despreading. RTWP(t) is the Received Total Wideband Power and is measured at the antenna connector.

$$RTWP(t) = \sum_{k=1}^{K} P_k(t) + I^N(t) + N(t) \quad (2)$$

$I^N(t)$ denotes the power received from neighbour cells ($^N$) in the WCDMA network. One of the difficulties in estimating RoT is separating the thermal noise power from the interference from neighbour cells.

Another specific problem that needs to be addressed is that the signal reference points are, by definition, at the antenna connector. However, the measurements are obtained after the analogue signal conditioning chain, in the digital receiver. The analogue signal conditioning chain introduces a scale factor error of about 1 dB (1-sigma) that is difficult to compensate for. Fortunately, all powers of Equation 2 are equally affected by the scale factor error so when (1) is calculated, the scale factor error is cancelled as shown in Equation 3:

$$RoT^{DigitalReceiver}(t) = \frac{RTWP^{DigitalReceiver}(t)}{N^{DigitalReceiver}(t)} \quad (3)$$

$$= \frac{\gamma(t)RTWP^{Antenna}(t)}{\gamma(t)N^{Antenna}(t)}$$

$$= RoT^{Antenna}(t)$$

γ is a scale factor from the antenna owing to effects of cabling and front end electronics.

In order to understand the fundamental problem of neighbour cell interference when performing load estimation, note that $$I^N(t)+N(t)=E[I^N(t)]+E[N(t)]+\Delta I^N(t)+\Delta N(t) \quad (4)$$

where E[.] denotes mathematical expectation and where Δ denotes the variation around the mean. Since there are no measurements available in the Radio Base Station (RBS) that are related to the neighbor cell interference, a linear filtering operation can at best estimate the sum $E[I^N(t)]+E[N(t)]$. However, this estimate cannot be used to deduce the value of E[N(t)]. This is because we can only estimate the sum, and not an individual component of the sum. It has been shown that the noise power floor is not mathematically observable.

Figure 1:
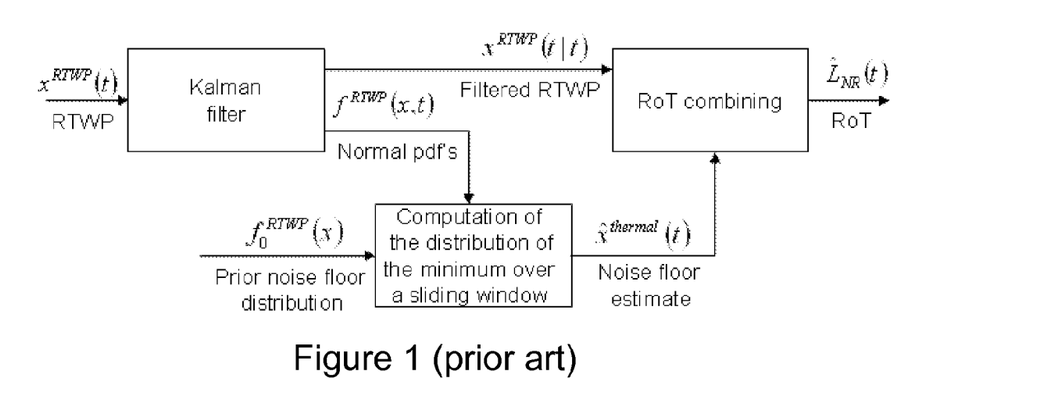
FIG. 1 illustrates schematically in a block diagram a sliding window algorithm for estimating RoT.

There are several known ways of estimating RoT. One example is to use a sliding window algorithm, as illustrated in FIG. 1. This algorithm estimates the RoT, as given by Equation 1. The main problem solved by the estimation algorithm is the accurate estimation of the thermal noise floor N(t). Since it is not possible to obtain accurate estimates of N(t) owing to the neighbor cell interference, the estimate therefore uses an approximation, by considering a soft minimum as computed over a relatively long period of time. This estimate of RoT therefore relies on the noise floor being substantially constant over long periods of time, disregarding small temperature drifts The sliding window algorithm described above has a disadvantage of requiring a large amount of storage memory. This becomes particularly troublesome in scenarios in which a large number of instances of the algorithm are required, for example when IC is introduced in the uplink. To reduce the memory consumption, it is known to use a recursive algorithm that reduces the memory requirements of the sliding window algorithm by a factor of at least 100.

Turning now to cell stability load estimation, this functionality exploits load factors for each user. In their simplest form, the load factors are given by Equation 5, in which:

$$L_u = \frac{P_u}{RTWP} = \frac{(C/I)_u}{1+(C/I)_u}, \quad (5)$$

$$u = 1, \ldots, U$$

$L_u$ is the load and $P_u$ is the power of user u. $(C/I)_u$ is the carrier to interference ratio of user u. Load factors are then summed for each power-controlled user. In this way, the neighbour cell interference is not included in the resulting load measure. This is a reasonable assumption since the neighbour cell interference should not affect the user's cell power control loop, at least not when first order effects are considered.

Turning now to IC, the conventional procedure to perform IC is summarized by the following steps:

1. The channel of the interferer to be cancelled is estimated;
2. The transmitted signal of the interferer to be cancelled is decoded;
3. A replica of the received signal of the interferer to be cancelled is created by use of the channel and the decoded signal. This replica may be reconstructed as an IQ chip stream; and
4. The replica of the interfering signal is subtracted from the received signal of the user to be decoded, thereby reducing the remaining power of the interferer to very low power levels.

It is important to note that the effect of this procedure is different for different users, since a user causing interference is also a user, and the interference will affect different users in different ways. A consequence for load estimation is that there is not a uniform way to analyse the interference of the WCDMA uplink; the load is individual for each user. As a consequence, combining user interference to an uplink cell load is no longer a trivial matter and requires special measures described below.

Also note that IC with regeneration and subtraction is more straightforward than with G-Rake+ (discussed below) as there is no change of the scale factor for the thermal noise power floor. A consequence is that the RoT estimation algorithms available without IC are still applicable in this case, since a constant noise power level is estimated.

A difference between G-Rake+ and conventional RAKE is that each user perceives a reduced level of interference immediately after a weight combining step. In G-Rake+, a covariance matrix $\hat{R}_u$, $u=1, \ldots, U$, with the order equal to the number of fingers is estimated to analyse the interference. Any codes not used by a present user u can be used in order to estimate $\hat{R}_u$.

A G-Rake+ receiver uses an estimated covariance matrix that models the interference in order to compute the combining weights for the users u, $u=1, \ldots, U$.

$$\hat{R}_u \hat{w}_u = \hat{h}_u, u=1, \ldots, U \quad (6)$$

where $\hat{h}_u$, $u=1, \ldots, U$, is the net channel response of user u and where $\hat{w}_u$ are the combining weights.

The effect of Equation (6) is that G-Rake+ essentially 'whitens' the correlated interference and removes large spectral peaks from interferers at certain finger locations and for certain antenna elements.

Note that G-Rake+ is a linear receiver. There is a related type of IC receiver for WCDMA which is also linear, denoted the 'chip equalizer'. The difference between G-Rake+ and the chip equalizer is simply the order of certain basic operations. The following description refers to G-Rake+, but can also be applied to chip equalizers.

In order to estimate load, taking account of the G-Rake+ IC gain, the powers after weight combining are studied. First, it is assumed that the received signal of user u on code $k \in \Omega_u$ is $$y_{u,k} = h_u s_{u,k} + I_{u,k} + N_{u,k}, u=1, \ldots, U, k=1, \ldots, K \quad (7)$$

where $\Omega_u$ denotes the set of codes for user u, $s_{u,k}$, $u=1, \ldots, U$, $k=1, \ldots, K$, is the signal, $I_{u,k}$, $u=1, \ldots, U$, $k=1, \ldots, K$, is the interference and $N_{u,k}$, $u=1, \ldots, U$, $k=1, \ldots, K$, is the (thermal) noise signal (not power) and $\hat{h}_u$, $u=1, \ldots, U$, is the net channel response of user u. G-Rake+ then performs weight combining to obtain statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k},$$
$$u=1, \ldots, U, k=1, \ldots, K. \quad (8)$$

$$\hat{R}_u \hat{w}_u = \hat{h}_u, u=1, \ldots, U \quad (9)$$

where $\hat{w}_u$ are the combining weights of G-Rake+, and $\hat{R}_u$ is the estimated covariance matrix that models the interference for computation of the combining weights for the users. Equations (8) and (9) have two main implications; one indicating how power measurements can be obtained and one indicating the scale factor problem which is addressed below.

Using Equation (8) it can be seen that the effect of the G-Rake+ weight combining is the same as if an artificially generated received signal $z_{u,k}^{G+}$ had been processed. Since these signals reflect the weight combining and thereby the IC gains of the G-Rake+ receiver, $z_{u,k}^{G+}$, $u=1, \ldots, U, k=1, \ldots, K$ is believed to be a relevant starting point for load estimation.

As stated above, the load estimator operates by processing of the RTWP and possibly the RSEPS. For this reason, similar power signals need to be formed from $z_{u,k}^{G+}$, $u=1, \ldots, U$, $k=1, \ldots, K$, in order to reuse the load concept applied without IC.

In order to estimate user powers associated with the G-Rake+ sufficient statistics, Equation (8) and a low degree of correlation between its three terms is assumed. This leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_u,$$
$$\equiv N_{u,k}^H \hat{w}_u \equiv S_{u,k}^{G+} + I_{u,k}^{G+} + N_{u,k}^{G+}, u=1, \ldots, U,$$
$$k=1, \ldots, K \quad (10)$$

The RoT, as seen by user u, can now be defined using Equations (11) to (14):

$$RoT_u^{G+} \equiv \frac{S_u^{G+} + I_u^{G+} + N_u^{G+}}{N_u^{G+}} \quad (11)$$

$$S_u^{G+} = \sum_{k \in \Omega_u} S_{u,k}^{G+} \quad (12)$$

$$I_u^{G+} = \sum_k I_{u,k}^{G+} \quad (13)$$

$$N_u^{G+} = \sum_k N_{u,k}^{G+} \quad (14)$$

Note that it is difficult to distinguish between $S_{u,k}^{G+}$, $I_{u,k}^{G+}$ and $N_{u,k}^{G+}$ for $k \in \Omega_u$ unless both $I_{u,k}^{G+}$ and $N_{u,k}^{G+}$ are computed using other quantities. Equation (10) expresses the power using the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting may be used for validation of the concept, but the following discussion uses the definitions provided by Equations (10) to (14).

The signal power $S_u^{G+}$ is computed directly from Equation (12). Combining Equations (10) and (12) results in Equation (15):

$$S_u^{G+} = \sum_{k \in \Omega_u} S_{u,k}^{G+} \quad (15)$$
$$= \hat{w}_u^H \hat{h}_u \hat{h}_u^H \hat{w}_u \sum_{k \in \Omega_u} |s_{u,k}|^2$$
$$= \hat{w}_u^H \hat{h}_u \hat{h}_u^H \hat{w}_u \hat{E}_{s,u}$$
$$= |\hat{w}_u^H \hat{h}_u|^2 \hat{E}_{s,u},$$

$$u = 1, \ldots, U$$

In order to compute the white noise power floor $N_u^{G+}$, the thermal noise power floor estimation algorithm is used to estimate the thermal noise power floor before any G-Rake+ processing. A problem then arises since the thermal noise is scaled by $\hat{w}_u$, and so the thermal noise power level will no longer appear to be constant.

In order to circumvent this problem, a calculation is made of the scale factor by which the thermal noise power is scaled. To compute this quantity, first note that when the wideband thermal noise power floor is estimated before G-Rake+ processing, e.g. with a basic noise floor estimator, the following quantity is estimated $$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}] \quad (16)$$
$$= KP_{N_{u,k}}$$
$$= K\frac{1}{K}P_N$$
$$= N_0$$

where $N_0$ is the thermal noise power floor and where m is a sample summation index. The power at the sufficient statistics signal processing point is however $$\hat{N}^{G+} = \frac{1}{M}\sum_{m=1}^{M}\sum_{k=1}^{K}(\hat{w}_u^H N_{u,k}^m)^H \hat{w}_u^H N_{u,k}^m \quad (17)$$
$$= \frac{1}{M}\sum_{m=1}^{M}\sum_{k=1}^{K}tr\big((\hat{w}_u^H N_{u,k}^m)^H \hat{w}_u^H N_{u,k}^m\big)$$
$$= \frac{1}{M}\sum_{m=1}^{M}\sum_{k=1}^{K}tr\big(\hat{w}_u^H N_{u,k}^m (\hat{w}_u^H N_{u,k}^m)^H\big)$$
$$= \frac{1}{M}\sum_{m=1}^{M}\sum_{k=1}^{K}tr\big(\hat{w}_u^H N_{u,k}^m (N_{u,k}^m)^H \hat{w}_u\big)$$
$$= tr\left(\sum_{k=1}^{K}\hat{w}_u^H\left(\frac{1}{M}\sum_{m=1}^{M}N_{u,k}^m (N_{u,k}^m)^H\right)\hat{w}_u\right)\xrightarrow[M\to\infty]{}$$
$$tr\big(K\hat{w}_u^H E[N_{u,k}(N_{u,k})^H]\hat{w}_u\big)$$
$$= tr\big(K\hat{w}_u^H (N_0/K)I\hat{w}_u\big)$$
$$= \hat{w}_u^H \hat{w}_u N_0$$
$$= \hat{w}_u^H \hat{w}_u \hat{N}.$$

The thermal noise floor at the sufficient statistics signal point can therefore be obtained from the noise floor estimate before G-Rake+ processing by a multiplication with the scale factor $$\kappa_u^{G+}=(\hat{w}_u)^H\hat{w}_u, u=1,\ldots,U \quad (18)$$

This leads to Equation (19):

$$N_u^{G+}=\kappa_u^{G+}\hat{N}, u=1,\ldots,U \quad (19)$$

The computation of the scale factor requires an additional inner product for each user.

The result of Equation (16) may be replaced by a more general assumption given in Equation (20):

$$\frac{1}{M}\sum_{m=1}^{M}\sum_{k=1}^{K}N_{u,k}^m(N_{u,k}^m)^H \xrightarrow[M\to\infty]{} KE[N_{u,k}(N_{u,k})^H] = K\frac{N_0}{K}R_N \quad (20)$$
$$= N_0 R_N,$$

This is used in a scenario in which sampling is fast enough to reflect the shape of the uplink spectrum. In this case it follows that Equation (16) is transformed into Equation (21):

$$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}] \quad (21)$$
$$= Ktr(E[N_{u,k}(N_{u,k})^H])$$
$$= N_0 tr(R_N)$$

Furthermore, Equation (17) is transformed into Equation (22):

$$\hat{N}^{G+}=N_0 tr(\hat{w}_u^H R_N \hat{w}_u) \quad (22)$$

The end result in this case is the scale factor:

$$\kappa_u^{G+} = \frac{tr(\hat{w}_u^H R_N \hat{w}_u)}{tr(R_N)} \quad (23)$$

$I_u^{G+}$ can be computed using available SINRs. The code power to interference ratio can be expressed according to Equation (24):

$$(C/I)_u^{G+} = \frac{S_u^{G+}}{I_u^{G+}+N_u^{G+}}, \quad (24)$$
$$u = 1, \ldots, U$$

All of the quantities expressed in Equation (24) except for $I_u^{G+}$ have previously been computed, (see Equations (17) to (19)). Using these quantities, Equation (24) can be solved for $I_{uG+}$ giving:

$$I_u^{G+} = \frac{S_u^{G+}}{(C/I)_u^{G+}} - \kappa_u^{G+}\hat{N}, \quad (25)$$
$$u = 1, \ldots, U$$

The $(C/I)_u^{G+}$ quantity can be directly related to SINR. This is performed as $$(C/I)_u^{G+} = \frac{\left(\beta_{u,DPCCH}^2 + \beta_{u,EDPCCH}^2 + n_{u,codes}\beta_{u,EDPDCH}^2\right)}{\beta_{u,DPCCH}^2 SF_{u,DPCCH}}SINR_u^{G+} \quad (26)$$
$$= \frac{\beta_{u,effective}^2}{SF_{u,DPCCH}}SINR_u^{G+}$$

Combining Equations (25) and (26) gives Equation (27):

$$I_u^{G+} = \frac{S_u^{G+}}{(C/I)_u^{G+}} - \kappa_u^{G+}\hat{N} = \frac{SF_{u,DPCCH}}{\beta_{u,effective}^2}\frac{S_u^{G+}}{SINR_u^{G+}} - \kappa_u^{G+}\hat{N} \quad (27)$$

In order to compute $RoT_u^{G+}$, Equations (15), (19) and (27) are inserted into Equation (11), as shown in Equation (28):

$$RoT_u^{G+} \equiv \frac{S_u^{G+} + I_u^{G+} + \kappa_u^{G+}\hat{N}}{\kappa_u^{G+}\hat{N}} \quad (28)$$

$$= \frac{S_u^{G+}}{\kappa_u^{G+}\hat{N}}\left(1 + \frac{SF_{u,DPCCH}}{\beta_{u,effective}^2}\frac{1}{SINR_u^{G+}}\right),$$

$$u = 1, \ldots, U$$

These measures, for each user, can then be combined into an uplink measure as outlined below. Note that it is apparent from Equation (28) that when SINR is high then the RoT for the user is essentially determined by the remaining own power of the user. The RoT then increases when the SINR gets worse.

The computation of the equivalent of RTWP and RSEPS power, at the sufficient statistics signal point, is now described. It follows from Equation (28) that the equivalent of RTWP, seen by user u, becomes:

$$S_{u,RTWP}^{G+} = S_u^{G+}\left(1 + \frac{SF_{u,DPCCH}}{\beta_{u,effective}^2}\frac{1}{SINR_u^{G+}}\right), \quad (29)$$

$$u = 1, \ldots, U$$

The equivalent of RSEPS, as seen by user u, is therefore obtained by a summation over the RSEPS user codes, when still using $\hat{h}_u$ and $\hat{w}_u$ $$S_{u,RSEPS}^{G+} = \sum_{u_{RSEPS}=1}^{U_{RSEPS}} S_{u(u_{RSPES})}^{G+}, \quad (30)$$

$$u = 1, \ldots, U$$

$$S_{u(u_{RSEPS})}^{G+} = \sum_{k \in \Omega_{u(u_{RSEPS})}} S_{u,k}^{G+} \quad (31)$$

$$= \hat{w}_u^H \hat{h}_u \hat{h}_u^H \hat{w}_u \sum_{k \in \Omega_{u(u_{RSEPS})}} |s_{u,k}|^2$$

$$= \hat{w}_u^H \hat{h}_u \hat{h}_u^H \hat{w}_u \hat{E}_{s,u(u_{RSPES})}$$

$$= |\hat{w}_u^H \hat{h}_u|^2 \hat{E}_{s,u(u_{RSEPS})},$$

$$u_{RSEPS} = 1, \ldots, U_{RSEPS}$$

Note that the channel model of user u is retained when summing over the codes of the RSEPS users, and so the computation needs to be performed once for each user.

In order to obtain an uplink load measure when using G-Rake+, an average load measure can be obtained. Averaging over all users using Equation (28) gives the uplink load measure:

$$\langle RoT^{G+}\rangle = \frac{1}{U}\sum_{u=1}^{U} RoT_u^{G+} \quad (32)$$

This measure may not be suitable since it does not capture the effect of users with poor IC gain. It is these users that are more likely to cause instability owing to power increases. Similarly, the averaged RTWP and RSEPS measures become:

$$\langle S_{RTWP}^{G+}\rangle = \frac{1}{U}\sum_{u=1}^{U} S_{u,RTWP}^{G+} \quad (33)$$

$$\langle S_{RSEPS}^{G+}\rangle = \frac{1}{U}\sum_{u=1}^{U} S_{u,RSEPS}^{G+}. \quad (34)$$

Rather than performing averaging, an alternative approach is to use a worst case approach, in which the averaging is replaced by a maximum operation. This means that load estimation is performed by estimated the load perceived by the user that perceives the maximum total load. This conservative approach may improve cell stability arguments, although it may be too conservative. The worst case load is defined by Equations (35) to (38):

$$u_{max} = \arg\max_u(RoT_u^{G+}) \quad (35)$$

$$\max(RoT_u^{G+}) = RoT_{u_{max}}^{G+} \quad (36)$$

$$\max(S_{RTWP}^{G+}) = S_{u_{max},RTWP}^{G+} \quad (37)$$

$$\max(S_{RSEPS}^{G+}) = S_{u_{max},RSEPS}^{G+} \quad (38)$$

A third alternative to obtain an uplink load measure when using G-Rake+ is to obtain $RoT_u^{G+}$ for each user, and then select a user corresponding to a predetermined percentile.

The equations above show how an uplink cell load can be computed in terms of the RoT after G-Rake+ or chip equalizer whitening of the interference, as experienced by each user. Note that the interference caused by a user on other users may have a very different effect on the RoT experienced by further users. However, according to prior art disclosures, the RoT experienced by the users of the cell can be combined to a cell load, preferably using the user that experiences the worst RoT conditions.

When advanced receivers that cancel or suppress interference from other users are applied, such as G-Rake+, the conventional load measure without interference suppression is no longer valid. The conventional load measure is based on the assumption that each user affects all other users in exactly the same way, from a load perspective, since conventional receivers do not handle the interference from other users in any explicit way in the receiver. However, with advanced receivers such as G-Rake+, a user's effect on other users is not the same on all users, and the effect is a function of the IC or IS efficiency.

The load of the cell is used for scheduling of uplink EUL users (either existing users or new users joining the RAN). When performing scheduling, the cell load measure described for G-Rake+ provides a total scheduling headroom as compared to pre-determined thresholds. However, known solutions do not address the detailed impact and contribution of different existing users to the uplink RoT after G-Rake+ processing, and so the scheduler can not take this into account.

SUMMARY

According to a first aspect of the invention, there is provided a method of reducing an effect of user interference on other users in an uplink of a radio access network using interference suppression for at least one user. The method comprises selecting a user from a plurality of users using the radio access cell, and predicting a perceived Rise over Thermal value for the user after interference suppression in the event that scheduling grants to an interfering user in the radio access network are altered. On the basis of the prediction, scheduling grants to the interfering user are altered, thereby reducing the interference for the selected user.

As an option, the user using the radio access network is selected on the basis that the selected user is experiencing higher interference than other users of the plurality of users. This ensures that the highest impact is made on reducing interference.

The method optionally includes, after predicting a perceived Rise over Thermal value for the user after interference suppression in the event that scheduling grants to the interfering user are altered, selecting a further interfering user and predicting a perceived Rise over Thermal value for the user after interference suppression in the event that scheduling grants to the further interfering user are altered. This can be repeated so that scheduling grants are altered for several interfering users, which improves the reduction in interference.

In addition to performing the method for several interfering users, the method may be carried out on several users in the radio access network. The method optionally further comprises selecting an additional user from the plurality of users using the radio access network. A perceived Rise over Thermal value is predicted for the additional user after interference suppression in the event that scheduling grants to an interfering user in the radio access network are altered and, on the basis of the prediction, scheduling grants to the interfering user are altered, thereby reducing the interference for the additional user.

The invention may be applied to any type of radio access network in which interference suppression is used. Examples of the interference suppression include G-Rake+ processing and chip equalizer processing.

In order to take account of time delays in the radio access network, the method optionally comprises predicting a perceived Rise over Thermal value for the user after interference suppression using predicted information.

In the case of self-interference, the selected user is the interfering user.

The invention, in an optional embodiment, may be used in admission control. In this case, information relating to a Rise over Thermal value for at least one user is determined and signalled to a Radio Network Controller, which can use this information in determining admissions.

According to a second aspect of the invention, there is provided a node for use in a radio access network using interference suppression for at least one user. The node is provided with a processor for selecting a user from a plurality of users using the radio access cell. The processor is further arranged to predict a perceived Rise over Thermal value for the selected user after interference suppression in the event that scheduling grants to an interfering user in the radio access network are altered. The node is also provided with a scheduler for, on the basis of the prediction, altering scheduling grants to the interfering user, thereby reducing the interference for the selected user.

As an option, the processor is further arranged to select the user on the basis that the selected user is experiencing higher interference than other users of the plurality of users.

The processor is optionally arranged to, after predicting a perceived Rise over Thermal value for the user after interference suppression in the event that scheduling grants to the interfering user are altered, select a further interfering user. In this case, the processor is further arranged to predict a perceived Rise over Thermal value for the user after interference suppression in the event that scheduling grants to the further interfering user are altered.

The processor is optionally further arranged to select an additional user from the plurality of users using the radio access network, predict a perceived Rise over Thermal value for the additional user after interference suppression in the event that scheduling grants to an interfering user in the radio access network are altered. The scheduler is then arranged to, on the basis of the prediction, alter scheduling grants to the interfering user, thereby reducing the interference for the additional user.

As an option, the processor is arranged to predict a perceived Rise over Thermal value for the user after interference suppression using predicted information.

The processor is optionally arranged to determine information relating to a Rise over Thermal value for at least one user in the radio access network cell, in which case the node further comprises a further transmitter for signalling this information to a Radio Network Controller. The Radio Network Controller can use this information in determine admission control.

Whilst the node may be implemented as a separate node, it may also be a radio base station.

According to a fourth aspect of the invention, there is provided a computer program comprising computer readable code which, when run on a radio base station, causes the radio base station to perform a method as described in the first aspect of the invention.

According to a fifth aspect of the invention, there is provided a computer program comprising computer readable code which, when run on a Radio Network Controller, causes the Radio Network Controller to behave as a Radio Network Controller as described in the third aspect of the invention.

According to a sixth aspect of the invention, there is provided a computer program product comprising a computer readable medium and a computer program as described in either of the fourth or fifth aspects of the invention, wherein the computer program is stored on the computer readable medium.

DETAILED DESCRIPTION

Figure 2:
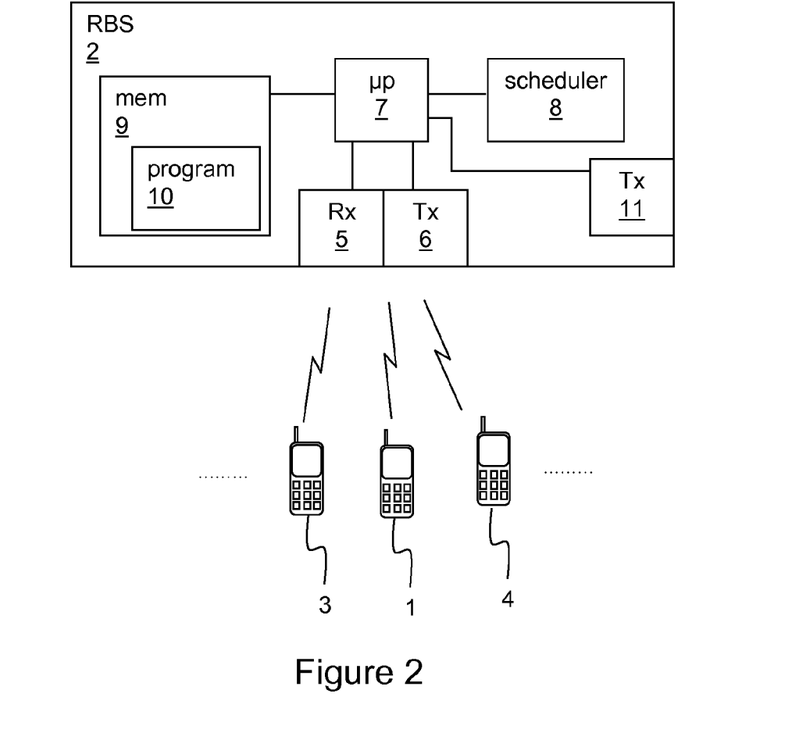
FIG. 2 illustrates schematically in a block diagram a Radio Base Station and users according to an embodiment of the invention.

Referring to FIG. 2, there is illustrated a user 1 of a Radio Access Network (RAN) that communicates with a Radio Base Station (RBS) 2 using an advanced receiver such as a G-Rake+ receiver. A plurality of other, interfering users 3, 4 are also illustrated. As described above, each user may cause interference for other users.

Cell capacity can be limited by the perceived Rot (in other words, the perceived load) of a user 1 or group of users. One way to increase the cell capacity is to lower the perceived RoT of a user 1 and reduce interference. In this example, user 3 has the most impact on the perceived RoT of the user 1. An increased cell capacity can then be achieved by issuing lower scheduling grants to the interfering user 3 (and, if required, other interfering users), that dominate the perceived load of user 1, that would otherwise limit the cell capacity when advanced receivers such as G-Rake+ receivers are used.

The present invention addresses this issue by making a calculation of an amount that an interfering user contributes to the load experienced by a user 1 with a G-Rake+ receiver. In a preferred embodiment, the G-Rake+ user 1 is typically selected to be the user that experiences the worst interference conditions among the users 1, 3, 4 in the cell, as this is the user that determines the cell load. This is fundamentally different approach to previous approaches, which only compute the total load that the user 1 with a G-Rake+ receiver experiences.

The calculation of the contributing amount can be repeated for many users. This means that the interfering user or users that contribute the largest amounts to the load of the G-Rake+ user 1 that determines the cell load are identified, and their scheduling grants can be altered accordingly.

The calculation is performed at the RBS 2. The RBS 2 is provided with a receiver 5 for receiving communications from the users 1, 3, 4 and a transmitter 6 for sending signals to the users 1, 3, 4. The receiver 5 and the transmitter 6 may be physically distinct or physically embodied in a single device such as a transceiver. A processor 7 is provided for controlling operation of the base station. A scheduler 8 is also provided for calculating scheduling grants for each user 1, 3, 4. It will be appreciated that the scheduler 8 may be a software function implemented by the processor, although it is shown separately in FIG. 2 for clarity. The RBS 2 is also provided with a computer readable medium in the form of a memory 9, on which a program 10 may be stored. The program 10, when run by the processor 7, causes the base station to implement the invention. In an optional embodiment of the invention described below, the RBS 2 is also provided with a further transmitter 11 for signalling RoT information to a Radio Network Controller (RNC).

In order to reduce the load of the cell and make room for other users, the scheduler 8 needs to take actions to reduce the load of the G-Rake+ user 1 that experiences the worst interference in the cell. This is done most efficiently by reducing the powers of those users 3, 4 that contribute with the largest amounts to the perceived load. This allows the RBS 2 to schedule users in a more efficient manner, increasing the capacity of the EUL uplink between each user 1, 3, 4 and the RBS 2.

Instead of just mapping per-user experienced cell loads after G-Rake+ processing to per-cell cell loads after G-Rake+ processing through, for example, a worst case assessment, the user 1 with the per-user cell load that affects the per-cell quantity the most is targeted. This allows for reduction of that user's 1 impact on the per-cell cell load. Typically this is achieved by granting one or more users 3, 4 (and possibly also user 1), a lower scheduling grant; in other words, they will be restricted to using a smaller amount of the air interface resources than they would otherwise have been granted. As a consequence, the user's 1 per-user quantity (e.g. RoT after G-Rake+ processing) is lowered and so is the per-cell cell load. This results in an increased scheduling headroom and increased cell capacity.

By way of example, a prior art network might use simple receivers (e.g. RAKE or G-Rake) without cancellation or suppression of interference from other users. The load is measured in terms of RoT (which is easy converted to/from the unit-less quantity (fractional) load). If the load (RoT) in a cell is e.g. 12 dB, then typically each user experiences a load of 12 dB RoT. If there are 10 users in the cell, each user experience a load of 12 dB RoT. Consequently, the per-user load and the per-cell load are not distinguished from one another. As a consequence, system functions such as admission control and the scheduler 8 uses the load of 12 dB RoT as an input when admitting or scheduling users.

Figure 3:
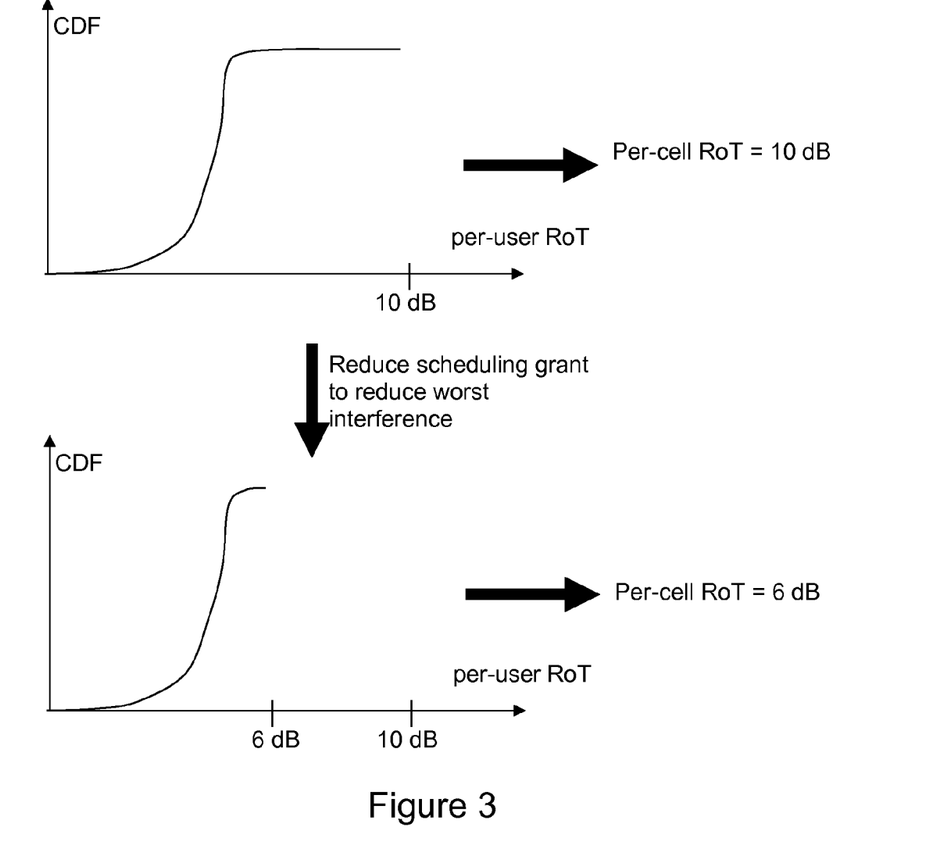
FIG. 3 shows the effect of reducing scheduling grants for interfering users that have the most effect on interference.

Assume now that one or more of the users uses an advanced receiver, such as G-Rake+. Owing to the interference cancellation or suppression functionality, most users will no longer perceive a 12 dB RoT. In this example, assume that each of the 10 users experiences 3, 3, 4, 4, 5, 5, 6, 6, 6 and 10 dB RoT respectively, depending on the interference whitening efficiency that each user experiences. These values are the per-user load. In prior art networks, in order to preserve coverage and stability in the cell, the per-user load is mapped to a per-cell quantity, which is used by admission control and the scheduler 8. The per-cell load measure may be selected to be the maximum per-user load, i.e. 10 dB RoT, as shown in FIG. 3.

The present invention identifies the user 1 (or users) that causes the per-cell load to increase drastically, and reduces scheduling grants to interfering users that have the largest effect on the user 1 to ensure that the user experiences a significantly lower RoT (in this case the user experiencing 10 dB RoT). The mapping from per-user load to per-cell load results in a lower per-cell load measure. If it can be arranged for user 1 to experience only 6 dB RoT by issuing a lower scheduling grant to some or more other interfering users, where said the interfering users cause the high RoT of user 1, then all of the users now experience (at most) 3, 3, 4, 4, 5, 5, 6, 6, 6 and 6 dB RoT respectively, and the mapping from per-user load to per-cell load results in a per-cell load of 6 dB RoT after G-Rake+ processing, as shown in FIG. 3. The scheduling headroom is therefore increased by 4 dB (10 dB-6 dB) and the cell capacity is increased.

Figure 4:
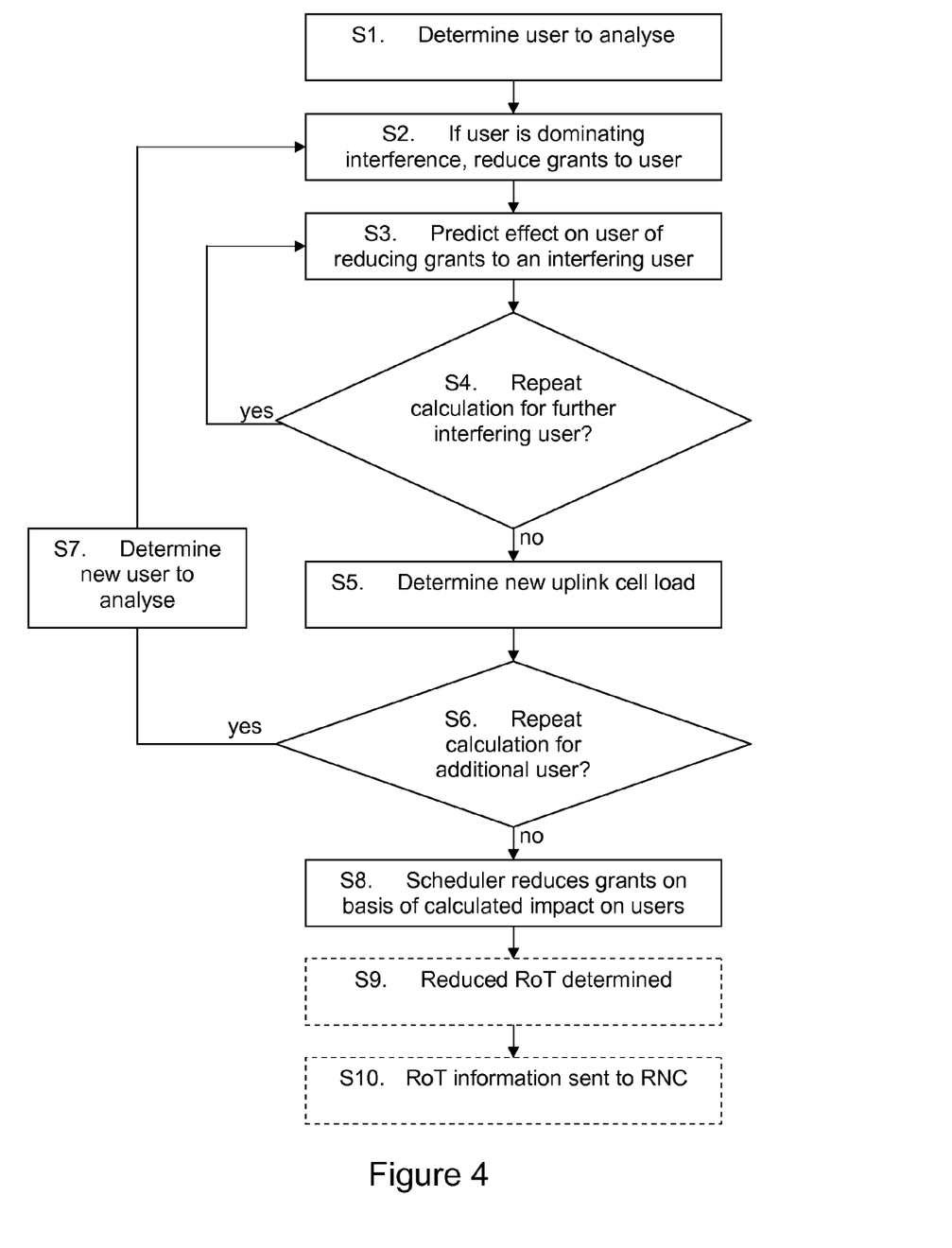
FIG. 4 is a flow diagram showing steps according to an embodiment of the invention.

FIG. 4 illustrates the steps according to an embodiment of the invention for reducing the effects of user interference. The following numbering corresponds to the numbering of FIG. 4:

S1. The user that is experiencing the worst interference is identified by applying Equations 35 to 38 to each user in order to ascertain which user is user $u_{max}$. In this example, user 1 is user $u_{max}$;

S2. It may be that user $u_{max}$ identified by Equations 35 to 38 may be dominating interference. This case is known as self-interference, and interference can be reduced by a reduction in the scheduling grant for user.

S3. A calculation is made to ascertain the effect a reduced scheduling grant would have on user 1 in terms of the RoT, after G-Rake+ processing has been applied. A calculation is made to determine what the new load per user would be if another user (for example user 3, and denoted by v in Equations 39 to 42 below) has a reduced scheduling grant and therefore transmits at a lower data rate. This load is denoted by a "prime" below. Using Equations 11 to 14, the following expressions follow $$S_u^{G+'} = S_u^{G+} = \sum_{k \in \Omega_u} S_{u,k}^{G+} \quad (39)$$

$$I_u^{G+'} = I_u^{G+} - \sum_{k \in \Omega'_v} I_{v,k}^{G+} = \sum_{k} I_{u,k}^{G+} - \sum_{k \in \Omega'_v} I_{v,k}^{G+}, \quad (40)$$

$$v = 1, \ldots, u-1, u+1, \ldots, U$$

$$N_u^{G+'} = N_u^{G+} = \sum_k N_{u,k}^{G+} \quad (41)$$

$$RoT_u^{G+'} \equiv \frac{S_u^{G+'} + I_u^{G+'} + N_u^{G+'}}{N_u^{G+'}} \quad (42)$$

$\Omega_v$ denotes the set of all codes for user 3, and $\Omega'_v$ denotes the set of codes removed from user 3 to asses the impact of a reduced grant to user 3 on the interference perceived by user 1. Note that in a scenario in which $\Omega'_v = \Omega_v$, user 3 is removed from the set of scheduled users.

S4 The above calculation only needs to be performed for the limiting user u. In one embodiment of the invention. Alternatively it can be repeated for more users, preferably following a descending order of limitation. Equation 40 can be performed over all users as indicated, or only until an interfering user is found that reduces the RoT of user 1 sufficiently. It will be appreciated that it is possible to reduce the grant of more than one interfering user in order to reduce the cell-level load.

$I_u^{G+'}$ is calculated by using the SINR measure. Using Equation 28, the following Equation applies:

$$RoT_u^{G+'} = \frac{S_u^{G+}}{\kappa_u^{G+} \hat{N}} \left( 1 + \frac{SF'_{u,DPCCH}}{\beta_{u,effective}^{2'}} \frac{1}{SINR_u^{G+'}} \right) \quad (43)$$

S5. Equations 39 to 43 are combined into a new uplink cell load measure, using Equations 35 to 38.

S6. The above steps need not only be performed for user 1, but if required can be performed for other users in addition to user 1. If this is not required, then the method proceeds to step S8.

S7. In this case a new user is selected for analysis (not user 1, but another user) and steps S2 to S6 are repeated. Note also that in the example given here, user 1 is user $u_{max}$, but it will be appreciated that the invention need not start with user $u_{max}$, but could start by selecting a user who is experiencing a lower level of interference.

S8. The impact of other users on selected limiting users has been addressed. The scheduler 8 uses the calculated impact of other users on user 1 (and possibly other limiting users) to provide a reduction of the load by reduction of the grants to interfering users that limit the per-cell load (by causing interference with user 1), thereby enhancing the headroom, and increasing the capacity of the cell.

The invention may also be used to improve the admission process of new users to a cell, as illustrated in optional steps S9 and S10:

S9. The reduced RoT of at least one user in cell, resulting from the application of steps S1 to S8, is determined.

S10. A message containing information relating to the RoT of at least one user (this could be a determined RoT value, a reduction in RoT etc) is sent to a RNC over the Iub interface. The RNC is responsible for admission control. As the RoT for the cell has been reduced, then the available headroom has increased. The RNC is able to use the received RoT information in its admission control function to determine that the available headroom has increased, thereby allowing admission for more users to the RAN. In this way, the invention can be used to improve admission control.

Figure 5:
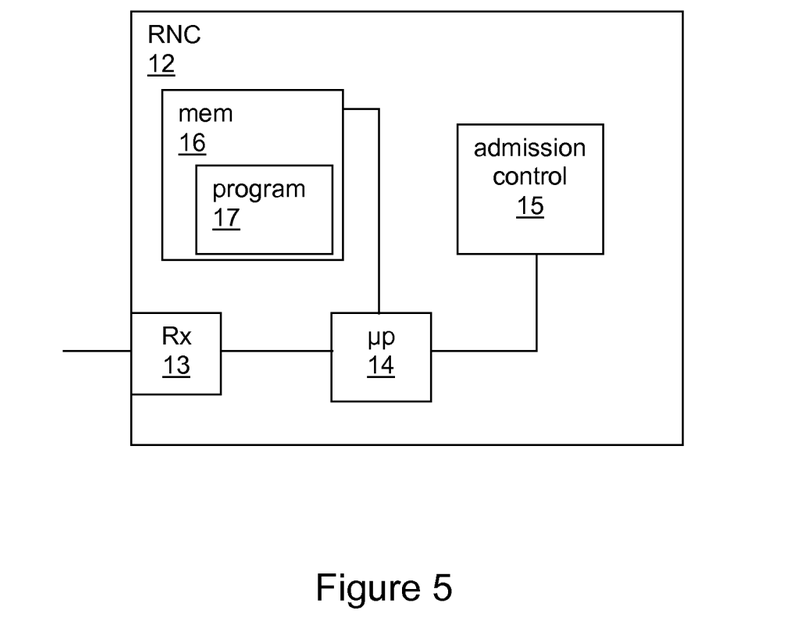
FIG. 5 illustrates schematically in a block diagram a Radio Network Controller according to an embodiment of the invention.

FIG. 5 illustrates a RNC 12 according to an embodiment of the invention. The RNC 12 is provided with a receiver 13 for receiving over the Iub interface the RoT information for the cell from the RBS 2. A processor 14 is used to control the operation of the RNC 12. An admission control function 15 uses the received RoT information in determining admission control. Note that the admission control function 15 and the processor 14 are shown as separate entities, but the admission control function may be implemented using software that is run by the processor 14. The RNC 12 may also be provided with a computer readable medium in the form of a memory 16, on which a program 17 may be stored. The program 16, when run by the processor 14, causes the RNC 12 to behave as described.

A limitation of the invention is that the radio conditions should not vary too fast, and should be stationary, in most cases, for several tens of milliseconds. This is to ensure that the scheduler 8 can determine schedules based on the determined interference. One way to address this is to use extrapolation over time to estimate the expected interference. This is a reasonable approximation, for stationary mobile broadband users, which are the users that are most likely to use high rates and produce the most interference).

Note that the invention can be used when scheduling for EUL users in addition to admission of new users. The cell capacity and UL cell throughput is increased when using G-Rake+ or other advanced receivers, and users that incur high interference for other users after G-Rake+ processing have their scheduling grants reduced in order to assign to them less air-interface resources. This benefits other users as well as the cell capacity and/or coverage.

It will be appreciated by the person of skill in the art that various modifications may be made to the above-described embodiments without departing from the scope of the appended claims.

The following abbreviations and acronyms have been used in the above description:
DL Downlink
EUL Enhanced Uplink
IC Interference Cancellation
IS Interference Suppression
RAN Radio Access Network
RBS Radio Base Station
RNC Radio Network Controller
RoT Rise over Thermal
RSEPS Received Scheduled E-DCH Power Share
RTWPR Received Total Wideband Power
SINR Signal to Interference plus Noise Ratio
SIR Signal to Interference Ratio
UL Uplink
WCDMA Wideband Code Division Multiple Access

The invention claimed is:

1. A method of reducing interference in an uplink of a radio access network cell, the method comprising:
   selecting a user from a plurality of users using the radio access network cell;
   predicting a perceived Rise-over-Thermal value for the selected user, wherein the predicted value reflects the effects, after interference suppression for the selected user, of altering scheduling grants to an interfering user in the radio access network cell; and, on the basis of the prediction, altering scheduling grants to the interfering user, thereby reducing interference for the selected user.

2. The method of claim 1, further comprising selecting the user on the basis that the selected user is experiencing higher interference than other users of the plurality of users.

3. The method of claim 1, further comprising:

after said predicting of the perceived Rise-over-Thermal value, selecting a further interfering user; and predicting a second perceived Rise-over-Thermal value for the selected user, the second perceived Rise-over-Thermal value reflecting the effects, after interference suppression for the selected user, of altering scheduling grants to the further interfering user.

4. The method of claim 1, further comprising:

selecting an additional user from the plurality of users using the radio access network; and predicting a perceived Rise-over-Thermal value for the additional user, the perceived Rise-over-Thermal value for the additional user reflecting the effects, after interference suppression for the additional user, of altering scheduling grants to the interfering user; and on the basis of the prediction, altering scheduling grants to the interfering user, thereby reducing interference for the additional user.

5. The method of claim 1, wherein the interference suppression is effected using any of G-Rake+ processing and chip equalizer processing.

6. The method of claim 1, further comprising predicting a perceived Rise-over-Thermal value for the selected user, after interference suppression for the selected user, using predicted information.

7. The method of claim 1, wherein the selected user is the interfering user.

8. The method of claim 1, further comprising:

determining information relating to a Rise-over-Thermal value for at least one user in the radio access network cell; and sending a message comprising the information relating to a Rise-over-Thermal value to a Radio Network Controller.

9. A node for use in a radio access network using interference suppression, the node comprising:

a processor for selecting a user from a plurality of users using a radio access network cell, the processor being adapted to predict a perceived Rise-over-Thermal value for the selected user, the predicted value reflecting the effects, after interference suppression for the selected user, of altering scheduling grants to an interfering user in the radio access network cell;

a scheduler adapted to, on the basis of the prediction, alter scheduling grants to the interfering user, thereby reducing the interference for the selected user.

10. The node of claim 9, wherein the processor is further arranged to select the user on the basis that the selected user is experiencing higher interference than other users of the plurality of users.

11. The node of claim 9, wherein the processor is adapted to, after predicting the perceived Rise-over-Thermal value for the selected user, select a further interfering user and to predict a second perceived Rise-over-Thermal value for the selected user, the second predicted value reflecting the effects, after interference suppression for the selected user, of altering scheduling grants to the further interfering user.

12. The node of claim 9, wherein the processor is further adapted to select an additional user from the plurality of users using the radio access network, predict a perceived Rise-over-Thermal value for the additional user, wherein the predicted value for the additional user reflects the effects, after interference suppression for the additional user, of altering scheduling grants to the interfering user; and wherein the scheduler is further adapted to, on the basis of the prediction, alter scheduling grants to the interfering user, thereby reducing the interference for the additional user.

13. The node of claim 9, wherein the processor is adapted to predict a perceived Rise-over-Thermal value for the selected user, after interference suppression for the selected user, using predicted information.

14. The node of claim 9, wherein the processor is further adapted to determine information relating to a Rise-over-Thermal value for at least one user in the radio access network cell, the node further comprising a further transmitter for sending a message comprising the information relating to a Rise-over-Thermal value to a Radio Network Controller.

15. The node according to claim 9, wherein the node is a radio base station.

16. The node of claim 9, wherein the processor is further adapted to effect the interference suppression using any of G-Rake+ processing and chip equalizer processing.

17. A Radio Network Controller comprising:

a receiver for receiving, from a node in a radio access network using interference suppression, a message, the message comprising Rise-over-Thermal information relating to at least one user in a radio access network cell;

an admission control function for determining admission for other users to the radio access network cell, the determination being based at least in part on the received Rise-over-Thermal information.

18. A non-transitory computer-readable medium having stored thereupon computer-readable code which, when run on a radio base station serving a radio access cell, causes the radio base station to:

select a user from a plurality of users using the radio access cell;

predict a perceived Rise-over-Thermal value for the selected user, wherein the predicted value reflects the effects, after interference suppression for the selected user, of altering scheduling grants to an interfering user in the radio access cell; and, on the basis of the prediction, alter scheduling grants to the interfering user, thereby reducing interference for the selected user.

* * * * *

UNITED STATES PATENT AND TRADEMARK OFFICE
CERTIFICATE OF CORRECTION

PATENT NO. : 9,020,520 B2
APPLICATION NO. : 13/823347
DATED : April 28, 2015
INVENTOR(S) : Ringström et al.

Page 1 of 1

It is certified that error appears in the above-identified patent and that said Letters Patent is hereby corrected as shown below:

Specification

In Column 5, Line 62, in Equation (19), delete "$N_u^{G+} = \kappa_u^{G-} \hat{N}, u=1, \ldots, U$" and insert -- $N_u^{G+} = \kappa_u^{G+} \hat{N}, u=1,\ldots,U$ --, therefor.

In Column 6, Line 24, in Equation (22), delete "$\hat{N}^{G+} = N_0 tr(\hat{w}_u^H R_n \hat{w}_u)$," and insert -- $\hat{N}^{G+} = N_0 tr(\hat{\mathbf{w}}_\mathbf{u}^\mathbf{H} \mathbf{R}_N \hat{\mathbf{w}}_u)$ --, therefor.

In Column 6, Line 46, delete "$I_{uG+}$" and insert -- $I_u^{G+}$ --, therefor.

In Column 13, Line 25, delete "S4 The" and insert -- S4. The --, therefor.

In Column 14, Line 20, delete "program 16," and insert -- program 17, --, therefor.

Signed and Sealed this
Sixteenth Day of August, 2016

Michelle K. Lee
*Director of the United States Patent and Trademark Office*